No. 652,758. Patented July 3, 1900.
H. W. EICHER.
SAW SET.
(Application filed Sept. 18, 1899.)
(No Model.)
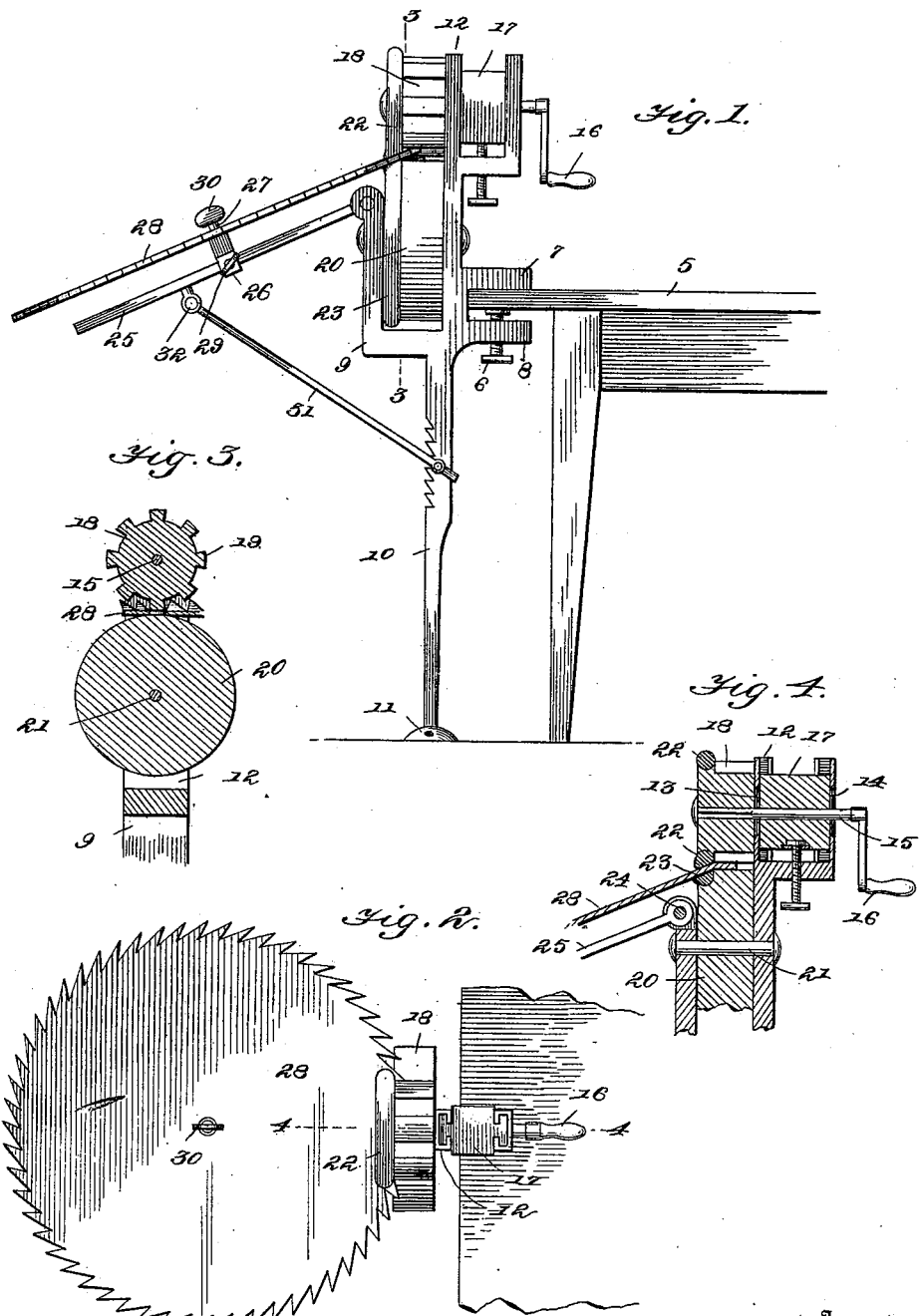
Witnesses  
Inventor  
H. W. Eicher

UNITED STATES PATENT OFFICE.

HARRY WALTER EICHER, OF BOYNTON, PENNSYLVANIA.

SAW-SET.

SPECIFICATION forming part of Letters Patent No. 652,758, dated July 3, 1900.

Application filed September 18, 1899. Serial No. 730,901. (No model.)

*To all whom it may concern:*

Be it known that I, HARRY WALTER EICHER, a citizen of the United States, residing at Boynton, in the county of Somerset and State of Pennsylvania, have invented a new and useful Saw-Set, of which the following is a specification.

My invention relates to saw-sets, and more particularly to that class of saw-sets used for setting the teeth of circular saws, the object of the invention being to provide a saw-set of this class of improved construction wherein means will be provided for adjusting the position of the saw and the amount of set and for properly feeding the saw to the setting devices.

With this object in view my invention consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part hereof, in which—

Figure 1 is a view in side elevation of a saw-set constructed in accordance with my invention secured to a bench or table in position for practical operation, a saw being shown in position to have its teeth set. Fig. 2 is a top plan view thereof. Fig. 3 is a vertical sectional view on the plane indicated by the broken line 3 3 of Fig. 1. Fig. 4 is a detail sectional view on the vertical plane indicated by the broken line 4 4 of Fig. 2.

Like numerals of reference indicate the same parts wherever they appear in the several figures of the drawings.

Referring to the drawings by numerals, 5 indicates a table or bench, upon the edge of which my saw-set is to be secured by means of a clamp-screw 6 and jaws 7 and 8, projecting horizontally from the frame 9 of the machine. An upright 10 depends from the frame and is secured to the floor at 11 in any suitable manner. Between the frame and an upright 12, in slots 13 and 14 therein, is slidably mounted a shaft 15, having a crank-handle 16. This shaft passes through a sliding block 17 and carries at its outer end a sprocket-like wheel 18, the teeth 19 of which serve as the upper jaws or dies of the set. A larger wheel 20, pivotally mounted on a shaft 21 in the frame below the sprocket-wheel 18, serves as the lower die or anvil. On the wheels 18 and 20 are rims 22 and 23, of vulcanized rubber, which serve to grasp and feed the saw to the setting-dies.

Pivotally secured at 24 to the frame is a bar 25, upon which is slidably mounted a block 26, carrying a stud 27, upon which the saw 28 to be set is pivotally mounted, the block being secured at any position on the bar by a set-screw 29 and the saw held from displacement from its pivot by a thumb-screw 30. A pawl or prop 31 is pivoted at 32 to the under side of bar 25 and is adapted to be engaged in the teeth of the rack 33 of the upright 10 to vary the angle of the saw with relation to the setting-dies, and consequently the amount or angle of set to be given by the dies. The adjustability of the block 26 on bar 25 provides for the proper securing of saws of different diameters or saws of the same diameter and different lengths of teeth. The vertical adjustment of the sliding block 17 and sprocket or die wheel 18 provides for the accommodation of saws of different thicknesses.

The saw having been properly adjusted, as shown in the drawings, the turning of the crank-shaft 15 will rotate the sprocket die-wheel 18 and rubber rims 22 and 23, and the rubber rims clamping the saw will rotate it and carry its teeth in succession under the dies or teeth 19, by which the teeth will be bent laterally down upon the anvil-wheel, and thus given the proper set.

While I have illustrated and described what I consider to be the best means now known to me for carrying out my invention, I do not wish to be understood as restricting myself to the exact forms of constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. In a saw-set, the combination of an anvil-wheel and a sprocket-like die-wheel, of rubber feeding-rims secured thereon, and means for adjusting the die-wheel nearer to or farther from the anvil-wheel, substantially as described.

2. In a saw-set the combination with an anvil-wheel and a sprocket-like die-wheel, rubber feeding-rims secured thereon, of a bar pivotally secured to the frame, means for adjusting it on its pivot, a slidable block on the pivoted bar carrying a stud upon which to place a circular saw, and means for adjusting, and securing the block, substantially as described.

3. In a saw-set the combination with a frame comprising uprights, a depending standard having a toothed rack, and means for clamping it to a support, of a sprocket-like die-wheel, an anvil-wheel mounted between two of said uprights, rubber feeding-rims secured on said wheels, a sliding block mounted between two of said standards and having a shaft on which is secured the die-wheel, a bar pivoted to one of the uprights, a sliding block carrying a stud and a set-screw, said block mounted on the said bar, a prop pivoted to the under side of the said bar, adapted at its free end to engage the teeth of the rack on the standards.

HARRY WALTER EICHER.

Witnesses:
J. C. HOSTETTER,
J. A. GRAVES.